(12) United States Patent
Ahn et al.

(10) Patent No.: US 10,728,498 B2
(45) Date of Patent: Jul. 28, 2020

(54) COMMUNICATION DEVICE, SERVER AND COMMUNICATION METHOD THEREOF

(71) Applicant: Hyperconnect, Inc., Seoul (KR)

(72) Inventors: Sangil Ahn, Cheongju-si (KR); Kangsik Jung, Seoul (KR)

(73) Assignee: HYPERCONNECT, INC., Seoul (KR)

( * ) Notice: Subject to any disclaimer, the term of this patent is extended or adjusted under 35 U.S.C. 154(b) by 0 days.

(21) Appl. No.: 16/177,597

(22) Filed: Nov. 1, 2018

(65) Prior Publication Data

US 2019/0132549 A1 May 2, 2019

(30) Foreign Application Priority Data

Nov. 2, 2017 (KR) .................. 10-2017-0145249

(51) Int. Cl.
*H04N 7/14* (2006.01)
*H04L 29/06* (2006.01)
*G06K 9/00* (2006.01)

(52) U.S. Cl.
CPC ......... *H04N 7/147* (2013.01); *G06K 9/00087* (2013.01); *H04L 65/403* (2013.01); *H04L 65/60* (2013.01)

(58) Field of Classification Search
CPC .......... G06K 9/00087; G06K 9/00288; G06K 9/00744; H04L 65/403; H04L 65/60; H04L 12/18; H04L 63/102; H04L 63/105; H04L 65/4038; H04L 65/4084; H04L 65/4092; H04L 65/602; H04L 65/604; H04L 65/607; H04N 7/147; H04N 2007/145; H04N 5/272; H04N 7/14; H04N 7/141; H04N 7/142; H04N 7/144; H04N 7/148; H04N 7/15; H04N 7/152; H04N 7/155; H04N 7/157; H04N 7/23206; G01S 5/0072; G06F 17/3028; H04M 1/72572; H04M 2201/40; H04M 2250/52; H04M 3/4936; H04M 3/5191; H04W 4/18; H04W 4/185
USPC ......... 348/14.01, 14.02, 14.03, 14.04, 14.05, 348/14.06, 14.07, 14.08, 14.09, 14.1, 348/14.11, 14.12, 14.13, 14.14, 15.15, (Continued)

(56) References Cited

U.S. PATENT DOCUMENTS 7,813,822 B1 * 10/2010 Hoffberg ............ G06K 9/00369
381/73.1
8,170,269 B2 * 5/2012 Murata .............. G06K 9/00288
382/100
(Continued)

*Primary Examiner* — Khai N. Nguyen
(74) *Attorney, Agent, or Firm* — Sughrue Mion, PLLC

(57) ABSTRACT

The communication method includes performing, by a first terminal, consecutive video call with at least one or more second terminal; selecting, by the first terminal, at least one or more representative frame from among a plurality of frames of an image being photographed during each video call; detecting, by the first terminal, a face from the at least one or more representative frame; generating, by the first terminal, a face recognition result that includes information on a number of the faces detected from the at least one or more representative frame; outputting, by the first terminal, the face recognition result to a server; and upon completion of the video call with the at least one or more second terminal, performing, by the first terminal, video call with a third terminal selected based on the face recognition result from the server.

15 Claims, 10 Drawing Sheets

(58) Field of Classification Search
USPC ............... 348/14.16; 382/275; 379/265.03; 455/414.1, 566; 704/270
See application file for complete search history.

(56) References Cited

U.S. PATENT DOCUMENTS

| | | | | |
|---|---|---|---|---|
| 8,515,398 | B2* | 8/2013 | Song | H04M 1/27455 348/14.02 |
| 8,755,837 | B2* | 6/2014 | Rhoads | G06K 9/6253 455/556.1 |
| 8,797,381 | B2* | 8/2014 | Tojo | H04N 5/232 348/14.16 |
| 10,154,232 | B2* | 12/2018 | Faulkner | H04L 65/1063 |
| 2007/0274596 | A1* | 11/2007 | Murata | G06K 9/00288 382/209 |
| 2009/0309897 | A1* | 12/2009 | Morita | H04M 1/2535 345/629 |
| 2010/0177159 | A1* | 7/2010 | Tojo | H04N 5/232 348/14.16 |
| 2011/0053570 | A1* | 3/2011 | Song | H04M 1/27455 455/414.1 |
| 2012/0113135 | A1* | 5/2012 | Sakai | G06F 3/011 345/619 |
| 2013/0147897 | A1* | 6/2013 | Ichimura | H04M 1/72522 348/14.01 |
| 2013/0273968 | A1* | 10/2013 | Rhoads | G06K 9/6253 455/556.1 |
| 2017/0286759 | A1* | 10/2017 | Yao | G06K 9/00308 |
| 2018/0190322 | A1* | 7/2018 | Zukerman | G06K 9/00979 |
| 2018/0349708 | A1* | 12/2018 | van Hoof | G06K 9/00771 |
| 2019/0026544 | A1* | 1/2019 | Hua | G06T 7/194 |
| 2019/0132549 | A1* | 5/2019 | Ahn | H04N 7/147 |

\* cited by examiner

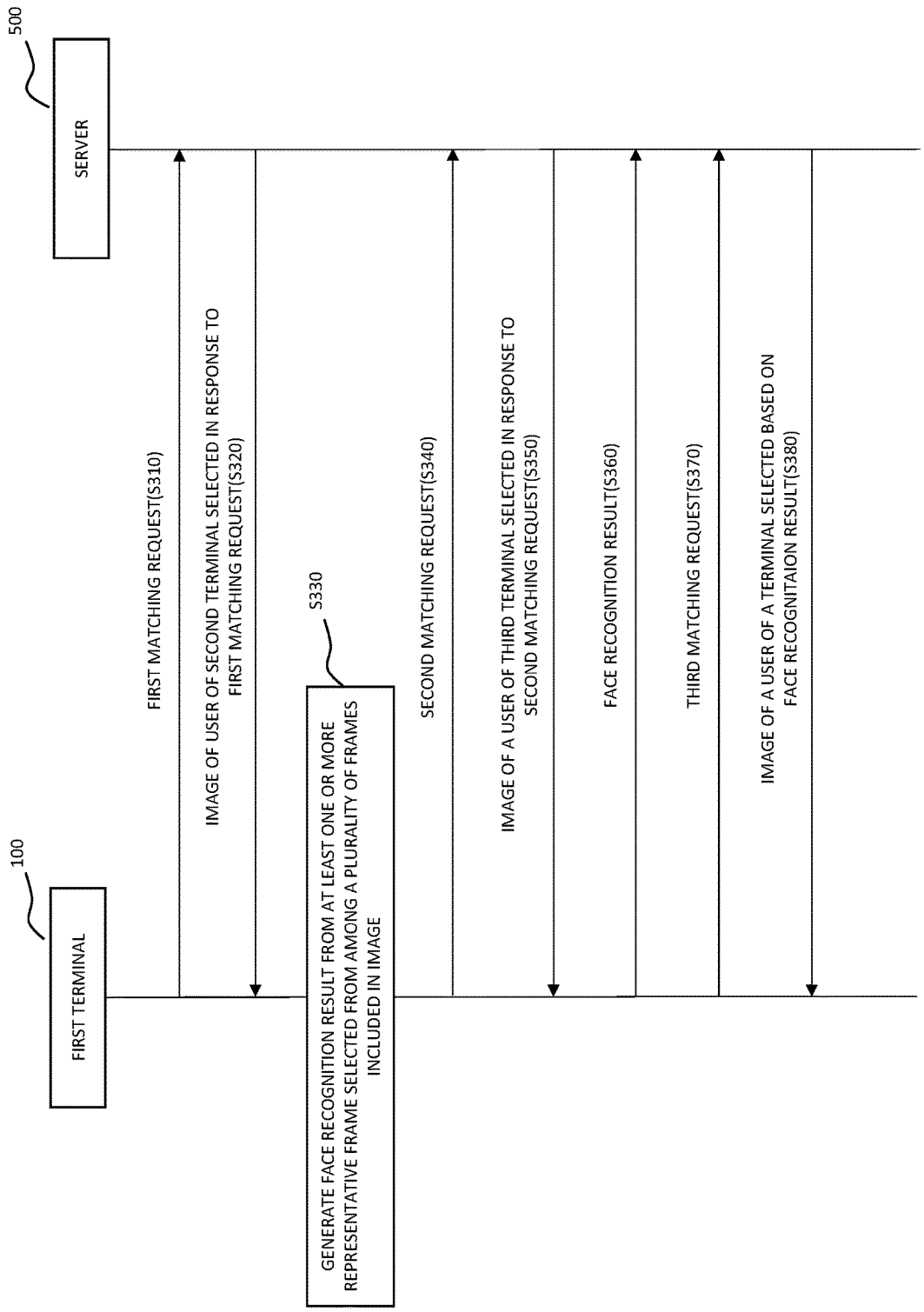

COMMUNICATION DEVICE, SERVER AND COMMUNICATION METHOD THEREOF

CROSS-REFERENCE TO THE RELATED APPLICATION

This application claims priority from Korean Patent Application No. 10-2017-0145249 filed on Nov. 2, 2017 in the Korean Intellectual Property Office, the disclosure of which is incorporated herein in its entirety by reference.

BACKGROUND

1. Field

The disclosed exemplary embodiments of the inventive concept relate to a communication device capable of mutually matching a plurality of communication devices more effectively, a server and a communication method thereof.

2. Description of the Related Art

As communication technologies develop and electronic devices become miniaturized, convenient and portable communication devices are coming into wide use for general consumers. Especially, in recent days, portable communication devices such as smart phones and smart tablet PCs are becoming widely used. Most of the communication devices include communication functions. Using these communication devices, a user may search the Internet or exchange messages with other users.

This user and the other users may or may not already know each other. A server may mutually connect a plurality of communication devices including the communication devices of the user and the communication devices of the other users. The server may mediate between the plurality of communication devices so that the user and the other users can exchange messages with each other. Of the plurality of communication devices, the server may mutually match the communication devices of the user and the communication devices of the other users. By doing this, the server may medicate between the communication devices of the user and the communication devices of the other users. Therefore, even when the user and the other users do not know each other, it is possible to exchange messages with each other through the mediation by the server.

SUMMARY

According to the disclosed embodiments, there may be provided a communication device that is capable of mutually matching a plurality of communication devices more effectively, a server and a communication method thereof.

Further, according to embodiments, there may be provided a communication device that is capable of mediating such that, from among users of a plurality of communication devices, an appropriate user can be matched to another user of another communication device, a server and a communication method thereof.

Further, according to embodiments, there may be provided a communication device where a user of each of a plurality of communication devices can expand human relations through mediation service, a server and a communication method thereof.

A communication method of a terminal according to an embodiment of the present disclosure includes performing, by a first terminal, consecutive video call with at least one or more second terminal; selecting, by the first terminal, at least one or more representative frame from among a plurality of frames of video image being photographed during each video call; detecting, by the first terminal, a face from the at least one or more representative frame; generating, by the first terminal, a face recognition result that includes information on a number of the faces detected from the at least one or more representative frame; outputting, by the first terminal, the face recognition result to a server; and upon termination of the video call with the at least one or more second terminal, performing, by the first terminal, video call with a third terminal selected based on the face recognition result from the server.

According to some embodiments, the selecting, by the first terminal, the at least one or more representative frame from the plurality of frames of the video image being photographed during the video call, may include selecting, by the first terminal, one representative frame from a certain section of the video image; and wherein, the detecting, by the first terminal, the face from the at least one or more representative frame, may include detecting, by the first terminal, the face from the one representative frame; and wherein, the generating, by the first terminal, the face recognition result that includes the information on the number of the faces included in the one or more representative frame may include generating, by the first terminal, the face recognition result that includes the information on the number of the faces detected from the one representative frame.

According to some embodiments, the selecting, by the first terminal, the at least one or more representative frame from the plurality of frames of the video image being photographed during the video call may include selecting, by the first terminal, a plurality of representative frames from a certain section of the video image; and wherein, the detecting, by the first terminal, the face from the at least one or more representative frame, may include detecting, by the first terminal, the face from each of the plurality of representative frames; and wherein, the generating, by the first terminal, the face recognition result that includes the information on the number of the faces detected from the at least one or more representative frame based on the recognition result may include generating, by the first terminal, the face recognition result based on the information on the number of the faces detected from each of the plurality of representative frames.

According to some embodiments, the generating, by the first terminal, the face recognition result based on the information on the number of the faces detected from the each of the plurality of representative frames may include generating, by the first terminal, the face recognition result based on an average value of the number of the faces detected from the each of the plurality of representative frames.

According to some embodiments, the generating, by the first terminal, the face recognition result based on the information on the number of the faces detected from the each of the plurality of representative frames may include generating, by the first terminal, the face recognition result from the number of the faces detected at a greatest frequency from among the numbers of the faces detected from the each of the plurality of representative frames.

A communication method according to an embodiment of the present disclosure includes receiving, by a server, a first matching request from a first terminal; mediating, by the server, such that video call can be performed between the first terminal and a terminal selected from among at least one or more terminal, in response to the first matching request;

receiving, by the server, a face recognition result being generated based on video image being photographed during the video call with the selected terminal, from the first terminal; receiving, by the server, a second matching request from the first terminal; selecting, by the server, a terminal to be matched with the first terminal from among the at least one or more terminal based on the received face recognition result, in response to the second matching request; and mediating, by the server, such that the video call can be performed between the first terminal and the selected terminal.

According to some embodiments, the selecting, by the server, the terminal to be matched with the first terminal from among the at least one or more terminal based on the received face recognition result, in response to the second matching request may include selecting a terminal that provided the face recognition result that is identical to the face recognition result received from the first terminal from among the at least one or more terminal.

According to some embodiments, the face recognition result may include information on the number of the faces detected from the at least one or more representative frame selected from the plurality of frames of the image.

According to some embodiments, the selecting, by the server, the terminal to be matched with the first terminal based on the received face recognition result, in response to the second matching request may include, in response to the number of the faces detected being plural, and in response to the face recognition result received from the first terminal from among the at least one or more terminal including information on the number of the faces that is two or more, selecting, by the server, a terminal that provided two or more face recognition results from among the at least one or more terminal as the terminal to be matched with the first terminal.

A communication method between a plurality of terminals and a server according to an embodiment of the present disclosure includes transmitting, by a first terminal from among the plurality of terminals, a first matching request, to the server; mediating, by the server, such that a video call can be performed with a second terminal selected from among the plurality of terminals, in response to the first matching request; generating, by the first terminal, a face recognition result after detecting the number of the faces included in at least one or more representative frame from among a plurality of frames of video image being photographed during the video call with the second terminal; transmitting, by the first terminal, a second matching request to the server, in a case where the video call between the first terminal and the second terminal is terminated; mediating, by the server, such that a video call can be performed with a third terminal selected from among the plurality of terminals, in response to the second matching request; transmitting, by the first terminal, the face recognition result to the server during matching with the third terminal; transmitting, by the first terminal, a third matching request to the server after the matching between the first terminal and the third terminal is terminated; selecting, by the server, a terminal to be matched with the first terminal from among the plurality of terminals based on the face recognition result received from the first terminal, in response to the third matching request; and transmitting, by the server, an image of a user of the selected terminal, to the first terminal.

According to some embodiments, the generating, by the first terminal, the face recognition result after detecting the face from the at least one or more representative frame from among the plurality of frames of the image being photographed during the matching with the second terminal may include selecting, by the first terminal, the at least one representative frame from a certain section of the video image; and detecting the face from the at least one or more representative frame, and generating the face recognition result that includes information on the number of the faces detected.

A communication device according to an embodiment of the present disclosure includes an inputter configured to receive a photographed video image; a controller configured to select at least one or more representative frame from among a plurality of frames of the video image, detect a face from the at least one or more representative frame, and generate a face recognition result that includes information on the number of the faces detected; and a communicator configured to transmit the face recognition result to a server, and receive from the server an image regarding a user of a terminal selected based on the face recognition result.

According to some embodiments, the controller may select the at least one or more representative frame per each certain section of the video image.

A communication method according to an embodiment of the present disclosure includes performing, by a first terminal, at least one or more video call; selecting, by the first terminal, at least one or more representative frame from among a plurality of frames of video image being photographed while performing a first video call with the second terminal; detecting, by the first terminal, a face from the at least one or more representative frame; generating, by the first terminal, a face recognition result that includes information on the number of the faces detected from the at least one or more representative frame; outputting, by the first terminal, the face recognition result to the server in the middle of performing the first video call or in the middle of a second video call with a third terminal being performed after the first video call; and performing, by the first terminal, a third video call with a fourth terminal selected based on the face recognition result from the server after the second video call.

According to the disclosed embodiments, there may be provided a communication device that is capable of mutually matching a plurality of communication devices more effectively, a server and a communication method thereof.

Further, according to embodiments, there may be provided a communication device that is capable of mediating such that, from among users of a plurality of communication devices, an appropriate user can be matched to another user of another communication device, a server and a communication method thereof.

Further, according to embodiments, there may be provided a communication device where a user of each of a plurality of communication devices can expand human relations through mediation service, a server and a communication method thereof.

BRIEF DESCRIPTION OF THE DRAWINGS

FIG. 10 is a flowchart illustrating a communication method of the terminal and server according to an embodiment of the present disclosure.

DETAILED DESCRIPTION OF EXEMPLARY EMBODIMENTS

Figure 1:
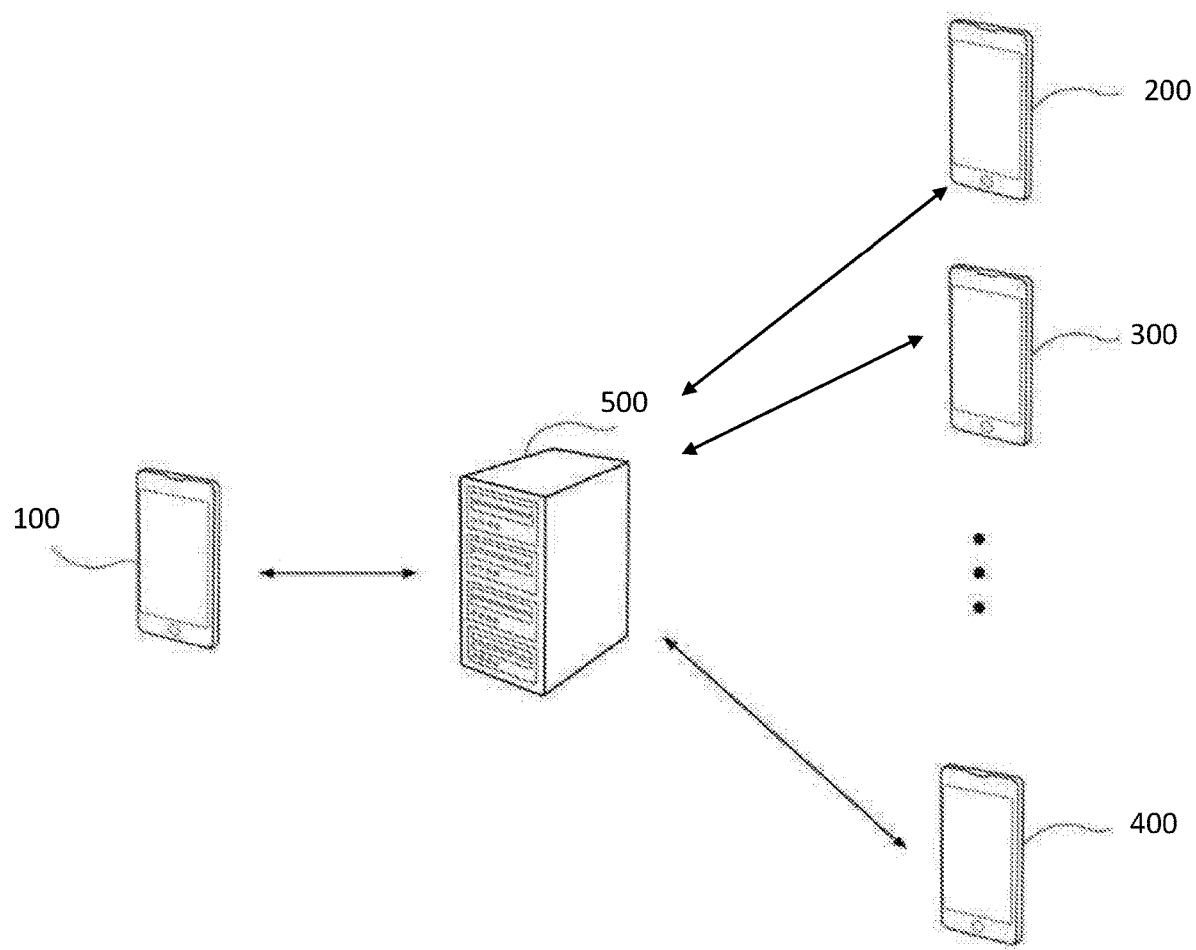
FIG. 1 is a network configuration diagram illustrating a server system environment where a server operates according to an embodiment of the present disclosure.

The advantages and characteristics of the present disclosure, and the method for achieving those advantages and characteristics will be clarified with reference to the embodiments that will be explained hereinafter together with the drawings attached hereto. However, the present disclosure is not limited to the embodiments disclosed hereinafter, but may be realized in various different forms, and the present embodiments are provided merely for the purpose of complete disclosure of the present disclosure, and for the purpose of informing a person skilled in the art of the scope of the present disclosure, and the present disclosure is to be defined only by the scope of the claims. Like reference numerals indicate like configurative elements through the entirety of the specification.

Even though "a first" or "a second" and the like are used to describe various configurative elements, these configurative elements are not limited by the aforementioned terms. The aforementioned terms can only be used to differentiate one configurative element from other configurative elements. Therefore, a first configurative element mentioned hereinafter may be a second configurative element within the technical idea of the present disclosure.

The terms used in the present specification were used to explain the embodiments, and not to limit the present disclosure. In the present specification, a singular form includes plural forms unless specially mentioned otherwise. "Comprises" or "comprising" used in the present specification imply that the mentioned configurative element or step does not exclude the presence or addition of one or more other configurative element or step.

Unless defined otherwise, all the terms used in the present specification may be construed to mean what may be commonly understood by a person skilled in the art. Further, the terms defined in generally used dictionaries should not be construed ideally or overly unless clearly defined specially.

FIG. 1 is a network configurative diagram illustrating an environment of a server system where a server operates according to an embodiment of the present disclosure. Referring to FIG. 1, the environment of the server system may include a server 500 and a plurality of communication devices 100 to 400.

Each of the plurality of communication devices 100 to 400 may be connected by the medium of the server 500. For convenience of explanation of the present disclosure, five communication devices are illustrated in FIG. 1. However, the number of the communication devices is not limited to five. Each of the plurality of communication devices 100 to 400 may be realized as any one of desktop computer, laptop computer, smartphone, smart tablet, smart watch, mobile terminal, digital camera, wearable device and portable electronic device. The plurality of communication devices 100 to 400 may execute a program or an application. For example, at least two communication devices of the plurality of communication devices 100 to 400 may be matched by the server 500. Further, the matched communication devices may perform video calls with each other.

The first communication device 100 may provide profile information to the server 500 in order to be matched with another communication device. For example, the profile information may include at least one of photographs, hobby information, nickname information, height information, date of birth information, gender information, living area information and school information of a user of the first communication device 100. The profile information is not limited thereto, but may include various information on the user of the first communication device 100.

The first communication device 100 may be connected to one of at least one or more communication devices 200 to 400 excluding the first communication device 100 from among the plurality of communication devices 100 to 400. While the first communication device 100 is matched with one of the at least one or more communication devices 200 to 400, the first communication device 100 may check whether a face included in an image being photographed is being detected. If the face is detected from the image being photographed in the first communication device 100, the first communication device 100 may determine the number of the faces being detected. Further, the first communication device 100 may transmit a face recognition result that includes information on the number of the faces detected, to the server 500.

At least one or more communication devices 200 to 400 may transmit the information on the number of the faces detected to the server 100 in a similar or same method as the first communication device 100. Each of the plurality of communication devices 100 to 400 may be matched from the server 500 based on the transmitted face recognition result. For example, in a case where the first communication device 100 requests a matching to the server 500, by the medium of the server 500, the first communication device 100 may be matched with a communication device from among the at least one or more communication devices 200 to 400 that provided the same face recognition result as the first communication device 100 and perform video call.

The server 500 may connect the plurality of communication devices 100 to 400 such that they can perform communication with each other. The server 500 may receive a matching request from each of the plurality of communication devices 100 to 400. In response to the matching request, the server 500 may match at least two communication devices of the plurality of communication devices 100 to 400. The server 500 may receive a face recognition result from each of the plurality of communication devices 100 to 400. For example, the face recognition result may be received in the server 500 at a certain time point prior to or during the matching. In another example, the face recognition result may be received in the server 500 periodically during the matching. When the face recognition result is received in the server 500, the server 500 may match at least two communication devices that provided the same face recognition result from among the plurality of communication devices 100 to 400.

Hereinbelow, for convenience of explanation of the present disclosure, communication device and terminal may be used as the same meaning. Further, a communication method of the plurality of communication devices 100 to 400 and the server 500 will be explained with reference to FIGS. 2 to 10.

Figure 2:
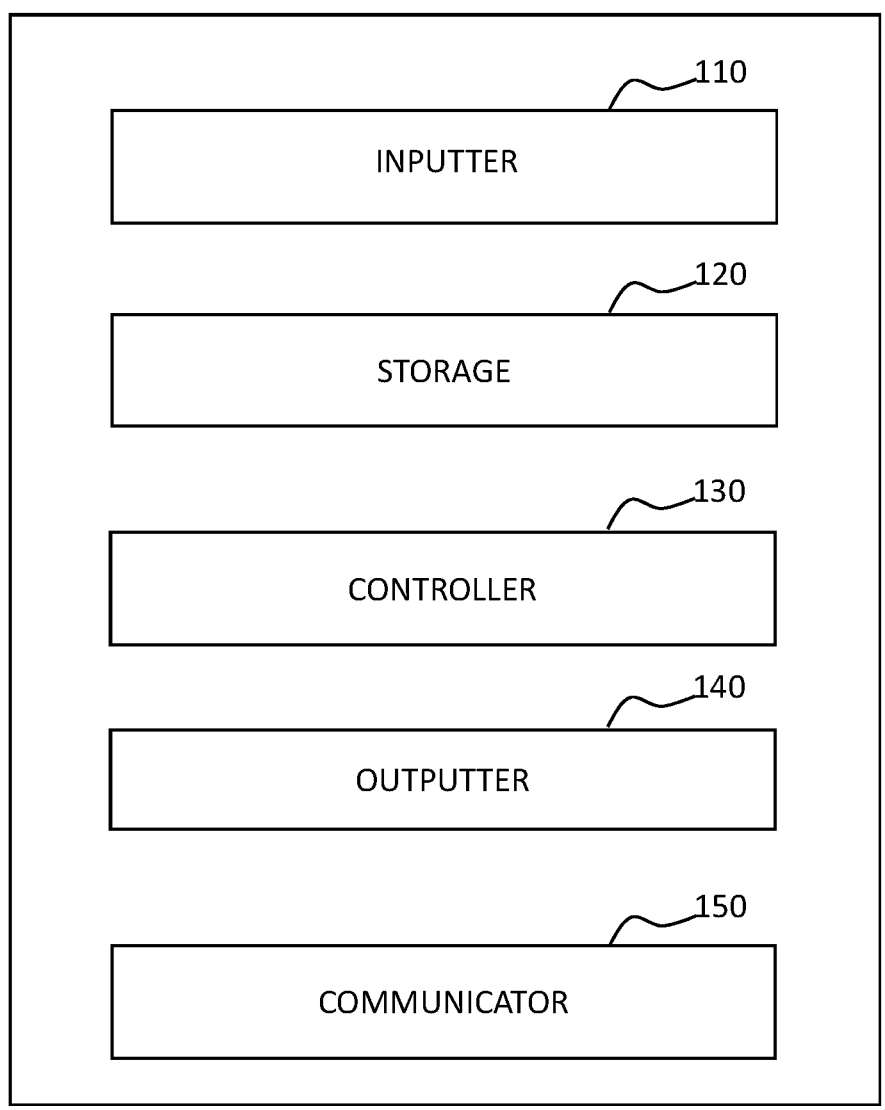
FIG. 2 is a block diagram illustrating a configuration of a terminal according to an embodiment of the present disclosure.

FIG. 2 is a block diagram illustrating a configuration of a terminal according to an embodiment of the present disclosure. Referring to FIG. 2, the first terminal 100 may include an inputter 110, storage 120, controller 130, outputter 140 and communicator 150. Referring to FIG. 1, at least one or more terminal 200 to 400 may each be realized to be similar or identical to the first terminal 100.

The inputter 110 may receive a signal from outside. The inputter 110 may receive a signal from a user of the first terminal 100. Further, the inputter 110 may receive a signal from an external device. The inputter 110 may include a microphone, camera, keyboard, mouse, track ball, touchscreen, button, switch, sensor, network interface and other input devices etc., for example. The inputter 110 may receive voice from outside through the microphone included in the inputter 110. Further, the inputter 110 may receive an image photographed by the camera included in the inputter 110.

The touchscreen included in the inputter 110 may receive a touch input by the user of the first terminal 100. The camera included in the inputter 110 may receive a gesture from the user of the first terminal 100.

The storage 120 may store data. The storage 120 may store the voice or image data received from the inputter 110. Further, the storage 120 may store an operation result performed by the controller 130. For example, the storage 120 may store voice that is encoded by the controller 130. The storage 120 may store the data to be transmitted outside through the communicator 150 or store the data received from outside through the communicator 150.

The storage 120 may include at least one of a volatile memory or nonvolatile memory. The storage 120 may include at least one of flash memory, Read Only Memory (ROM), Random Access Memory (RAM), Electrically Erasable ROM (EEROM), Erasable Programmable ROM (EPROM), Electrically Erasable Programmable ROM (EEPROM), Hard Disk Drive (HDD) and register, for example. The storage 120 may include file system, database, and embedded database etc., for example.

The controller 130 may control operations of the first terminal 100. The controller 130 may be mutually connected with each of the configurative elements included in the first terminal 100. The controller 130 may control operations of each of the configurative elements included in the first terminal 100. The controller 130 may control the operations of the first terminal in response to the signal received by the inputter 110.

The controller 130 may test an image being received through the inputter 110. For example, the controller 130 may test the image stored in the storage 120. In another example, the controller 130 may directly test the image being received through the inputter 110. That is, the controller 130 may test the information and data that includes an image from among the information and data being processed in the server 100.

The controller 130 may test the aforementioned image and determine whether the image (IMG) is obscene material for children. For example, the controller 130 may detect the face of at least one or more people that appear in the image, and based thereon, the controller 130 may generate information on the number of the faces appearing in the image. Operations of the controller 130 will be explained in more detail with reference to the drawings hereinbelow.

The outputter 140 may display a screen. The controller 130 may control such that the screen is displayed on the outputter 140. The outputter 140 may display a user interface. The outputter 140 may display another screen in response to an input from the user.

The outputter 140 may display data. The outputter 140 may display an operation result performed by the controller 130. The outputter 140 may display the data stored in the storage 120. The outputter 140 may display the data received by the communicator 150. For example, the outputter 140 may display the image being received from the server 500 or from at least one or more terminal 200 to 400.

The outputter 140 may include a flat panel display device such as Liquid Crystal Display (LCD), Organic Light Emitting Diode (OLED), and Plasma Display Panel (PDP), etc., for example. The outputter 140 may include a curved surface display or a flexible display. The outputter 140 may include a touchscreen.

The outputter 140 may output voice received from another terminal. The outputter 140 may output voice received through the inputter 110. The outputter 140 may include a speaker, for example. The outputter 140 may output the voice received from the inputter 110 and the voice received from the other terminal through the speaker.

The communicator 150 may transmit data to outside or receive data from outside. The communicator 150 may transmit the data to the server 500 and to at least one or more terminal 200 to 400. The communicator 150 may receive data from the server 500 and from the at least one or more terminal 200 to 400. The communicator 150 may transmit the operation result performed by the controller 130 to outside. For example, the communicator 150 may transmit to outside the face recognition result that includes information on the number of the faces. For example, the communicator 150 may transmit the face recognition result that includes the information on the number of the faces to the server 500. Further, the communicator 150 may transmit to outside the data stored in the storage 120.

The data to be transmitted by the communicator 150 or the data received by the communicator 150 may be stored in the storage 120. For example, the communicator 150 may transmit a message generated in the controller 130 to the server 500.

The communicator 150 may include a remote distance network interface such as 3G module, LTE module, LTE-A module, Wi-Fi module, WiGig module, Ultra Wide Band (UWB) module and LAN card, etc., for example. Further, the communicator 150 may include a short distance network interface such as Magnetic Secure Transmission (MST) module, Bluetooth module, NFC module, RFID module, ZigBee module, Z-Wave module and infrared ray module, etc. Further, the communicator 150 may include other network interfaces.

Figure 3:
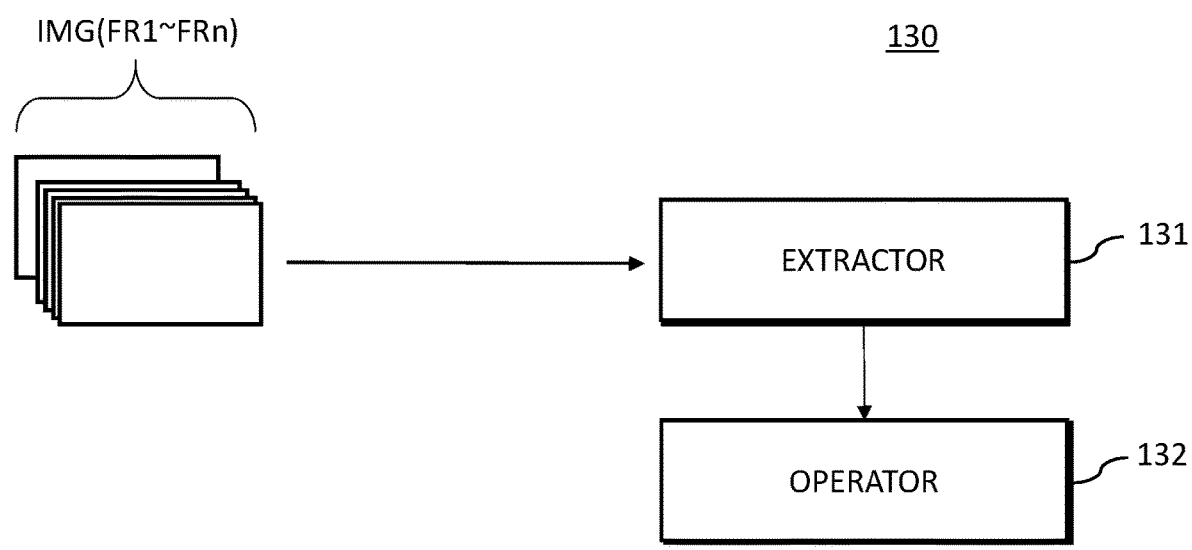
FIG. 3 is a block diagram illustrating in detail a controller of a first terminal according to an embodiment of the present disclosure.

FIG. 3 is a block diagram that illustrates in detail the controller of the first terminal according to an embodiment of the present disclosure. Referring to FIGS. 2 and 3, each of the controller 130 and the configurative elements included in the controller 130 may be realized in the form of software or hardware. For example, the software may be realized by program execution commands such as mechanical codes, firmware codes, embedded codes and applications, etc. The hardware may be electric electronic circuits, professors, computers, pressure sensors, inertia sensors, microelectromechanical system (MEMS), passive elements or a combination thereof. For simplicity of explanation, it will be assumed that the controller 130 tests the image (IMG) stored in the storage 120. However, there is no limitation thereto, and thus, an image received from the second terminal 200 or the image to be transmitted to the second terminal 200 may be tested.

Referring to FIG. 3, the controller 130 may receive the image (IMG) from the storage 120. For example, the image (IMG) may include a plurality of frames FR1 to FRn. The controller 130 may sense the number of the faces from the received image (IMG).

The controller 130 may include an extractor 131 and an operator 132. The extractor 131 may extract a face or a facial region from each of at least one or more representative frame from among the plurality of frames FR1 to FRn included in the image (IMG). Further, the operator 132 may operate the number of the faces included in the image (IMG) based on the face or facial region extracted from each of the at least one or more representative frame. The operator 132 may generate the face recognition result that includes the information on the number of the faces selected after operating the number of the faces.

The terms such as "number of persons", "number of the faces" and "faces of persons" used in the present disclosure may indicate the number of persons, number of the faces and faces of persons appearing within a frame, respectively, not the actual number of people or number of facial regions. Further, simplicity of explanation, the region where a face is included within a frame (that is, a facial region) may be referred to as terms such as "face detected within a frame" or "face of a person", etc. The aforementioned assumptions are assumptions intended to explain the technical characteristics of the present disclosure concisely and clearly, and thus the scope of the present disclosure is not limited thereto.

FIGS. 2 and 3 disclose an embodiment where the first terminal 100 extracts a face from an image (IMG). In another embodiment of the present disclosure, the first terminal 100 may transmit the image (IMG) photographed through the inputter 110 to the server 500. Further, the server 500 may select at least one or more representative frame from among the plurality of frames FR1 to FRn included in the image (IMG), and extract a face or facial region from the at least one or more representative frame.

Figure 4:
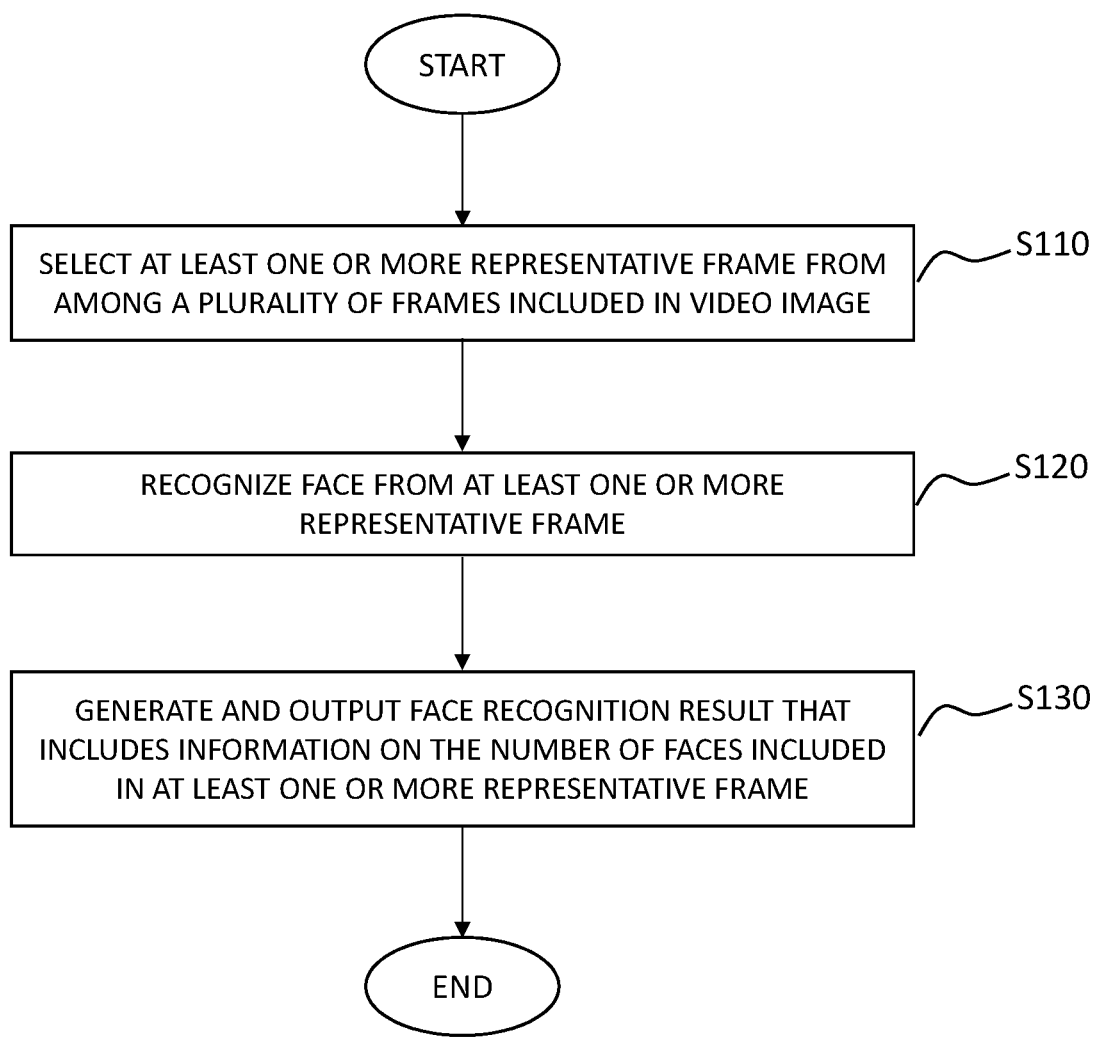
FIG. 4 is a block diagram illustrating an operation method of the controller of the first terminal.

FIG. 4 is a block diagram illustrating an operation method of the controller of the first terminal. Referring to FIGS. 2 to 4, at step S110, the controller 130 of the first terminal 100 may select the at least one or more representative frame from among the plurality of frames FR1 to FRn of the image. In such a case, the image may be received through the inputter 110 of the first terminal 100.

At step S120, the controller 130 of the first terminal 100 may recognize a face from the at least one or more representative frame. At step S130, the controller 130 of the first terminal 100 may generate a face recognition result that includes the information on the number of the faces included in the at least one or more representative frame. Further, the first terminal 100 may output the generated face recognition result to outside.

Figure 5:
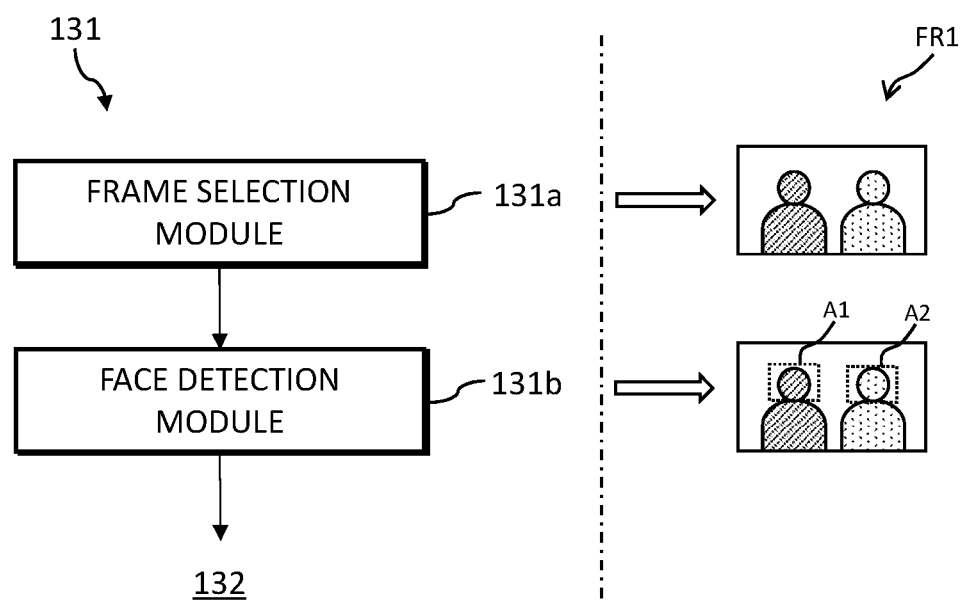
FIG. 5 is a diagram illustrating in detail an extractor of FIG. 2 according to an embodiment of the present disclosure.

FIG. 5 illustrates in detail the extractor of FIG. 2 according to an embodiment of the present disclosure. The extractor 131 may include a frame selection module 131a and a face detection module 131b. The extractor 131 may extract at least one or more peoples' face from the at least one or more representative frame selected from among the plurality of frames FR1 to FRn of the image (IMG) as explained with reference to FIG. 3.

The frame selection module 131a may select as the representative frame at least one or more frame from among the plurality of frames FR1 to FRn included in the image (IMG) being received during one matching. For example, the frame selection module 131a may select as the representative frame the first frame FR1 from among the plurality of frames FR1 to FRn included in the image (IMG). For example, the first frame FR1 may be selected from a certain section of the image (IMG). The first frame FR1 selected as the representative frame is provided to the face detection module 131b.

The face detection module 131b may detect a face from the selected first frame FR1. For example, the face detection module 131b may detect a first and second face A1 and A2 from the first frame FR1. For example, the face detected from the frame may indicate a predetermined region where the face is included.

For example, the face detection module 131b may detect the face from the first frame FR1 selected using a well-known face detecting algorithm. In one example of the face detecting algorithm, the face detection module 131b may detect the faces from the first frame FR1 by moving a plurality of rectangular regions within the frame. In this case, the face detection module 131b may prevent unnecessary facial region detection by setting a maximum size of the plurality of rectangular regions.

For example, since a plurality of persons may appear in the image (IMG), faces of at least two or more persons must be included within one representative frame. However, if the face of a person within one representative frame exceeds a predetermined size, it may be difficult to relatively compare with the face of another person within the same frame. Therefore, the face detection module 131b may reduce overhead regarding facial region detection by setting the maximum size of the plurality of rectangular regions to a predetermined size so as to prevent detection of a face exceeding the predetermined size.

The facial region detection method of the facial region detection module 131b according to the technical idea of the present disclosure is not limited to the aforementioned face detecting algorithm. For example, the face detection module 131b may detect characteristics of a face within the representative frame such as eye, nose and mouse, etc., and detect the faces of the persons within the representative frame based on the detected characteristics.

The face detection module 131b may transmit information on an extracted face to the operator 132. The operator 132 may operate the number of the faces based on the received information on the face and generate the face recognition result. For example, the operator 132 may receive information on two faces A1 and A2 from the face detection module 131b. The operator 132 may compute '2' as the face recognition result. The computed face recognition result (for example, '2') may be transmitted to the server 500 through the communicator 150.

Figure 6:
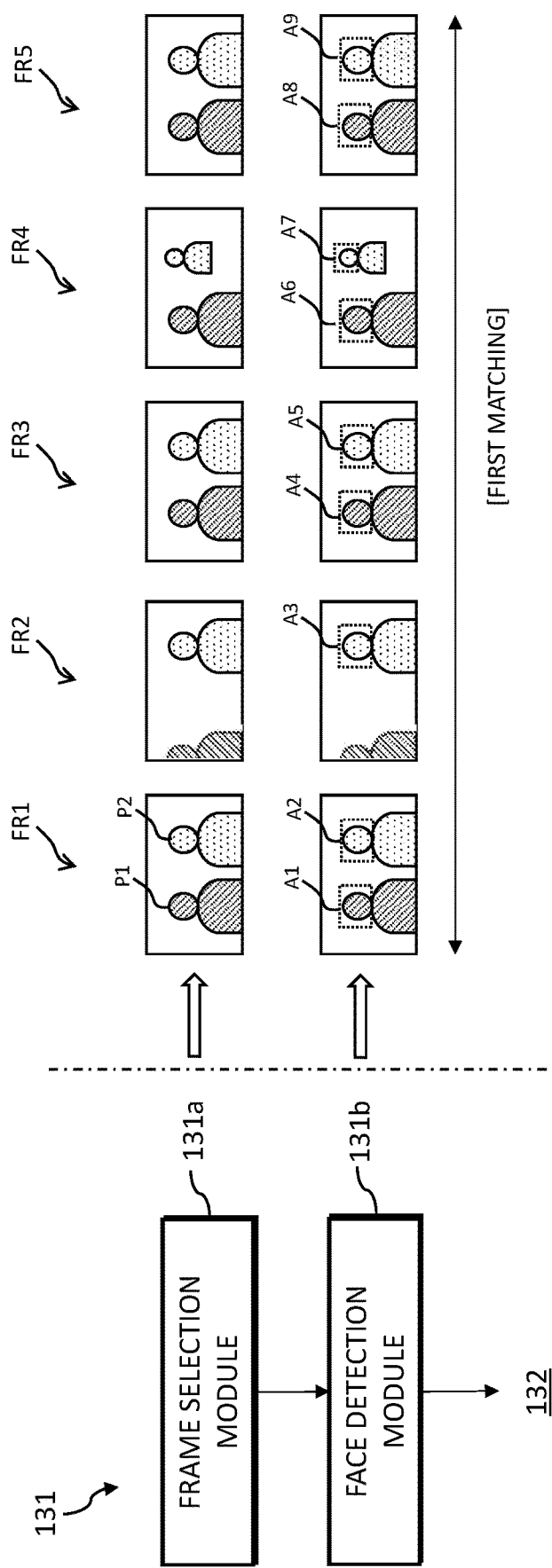
FIGS. 6 and 7 are diagrams illustrating in detail the extractor of FIG. 2 according to another embodiment of the present disclosure.
Figure 7:
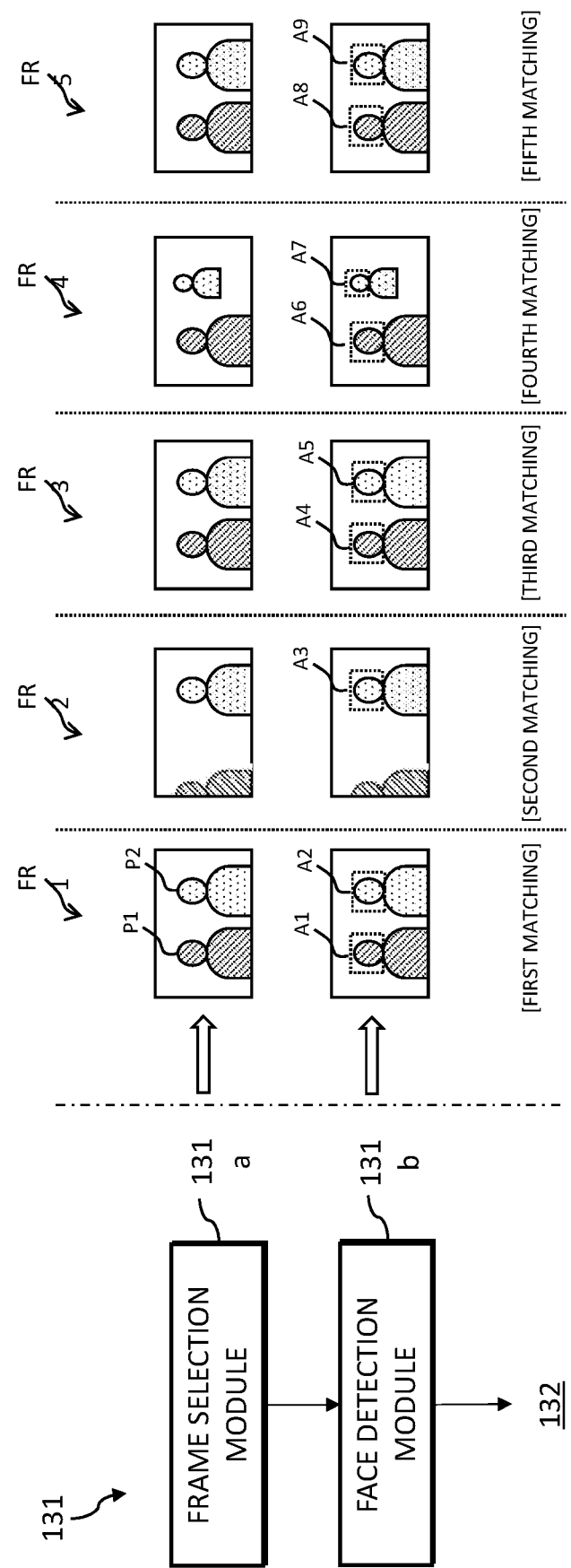

FIGS. 6 and 7 illustrate in detail the extractor of FIG. 2 according to another embodiment of the present disclosure. Referring to FIGS. 3, 6 and 7, the extractor 131 may include the frame selection module 131a and face detection module 131b. The extractor 131 may extract at least one or more person's face from the at least one or more representative frame selected from among the plurality of frames FR1 to FRn of the image (IMG) as explained with reference to FIG. 3.

The frame selection module 131a may select as representative frames some of the frames from among the plurality of frames FR1 to FRn included in the image (IMG). For example, the frame selection module 131a may select as the representative frames the first to fifth frames FR1 to FR5 from among the plurality of frames FR1 to FRn included in the image (IMG). The first to fifth frames FR1 to FR5 selected as the representative frames are provided to the face detection module 131b.

Referring to FIG. 6, the first to fifth frames FR1 to FR5 may be representative frames selected from among the plurality of frames FR1 to FRn being received during the first matching. For example, the frame selection module 131a may consecutively select the first to fifth frames FR1 to FR5 at a certain time point of the image (IMG) being received during one matching (for example, first matching). In another example, the frame selection module 131a may select each of the first to fifth frames FR1 to FR5 at every certain period in the image (IMG) being received during one matching (for example, first matching).

Referring to FIG. 7, each of the first to fifth frames FR1 to FR5 may be selected during different matching. The first frame FR1 may be the representative frame selected during the first matching by the server 500. The second frame FR2 may be the representative frame selected during the second matching by the server 500. The third frame FR3 may be the representative frame selected during the third matching by the server 500. The fourth frame FR4 may be the representative frame selected during the fourth matching by the server 500. Further, the fifth frame FR5 may be the representative frame selected during the fifth matching by the server 500. The present disclosure is not limited to the aforementioned embodiment. The frame selection module 131a may select at least one or more representative frame from each of the first to fifth matching.

For example, the first to fifth frames FR1 to FR5 may indicate frames for extracting a face (or facial region). For example, the frame selection module 131a may select the representative frames per each certain section of the image (IMG). For example, the certain sections of the image (IMG) may indicate a collection of a certain number of consecutive frames or a collection of frames during a certain consecutive time period. In another example, the frame selection module 131a may randomly select the representative frames. For example, each of the first to fifth frames FR1 to FR5 will be non-consecutive (that is, temporally not adjacent) to each other. Without limitation thereto, each of the first to fifth frames FR1 to FR5 will be frames that are consecutive (that is, temporally adjacent) to each other.

In the case of deciphering the relative face size regarding all the frames included in the image (IMG), operation quantity regarding the relative face size will increase, and the operation processing time will increase. Since the controller 130 according to an embodiment of the present disclosure selects the representative frames by the frame selection module 131a and operates the relative face sizes, overhead regarding the aforementioned operation may be reduced.

Referring to FIGS. 6 and 7, the face detection module 131b may detect a face from each of the first to fifth frames FR1 to FR5 selected. For example, the face detection module 131b may detect a first and second faces A1 and A2 from the first frame FR1, and detect a third face A3 from the second frame FR2. Likewise, the face detection module 131b may detect each of a fourth to ninth faces A5 to A9 from the third to fifth frames FR3 to FR5. For example, the face detected from the frame may indicate a predetermined region that includes that face.

The face detection module 131b may detect faces from each of the first to fifth frames FR1 to FR5 selected using the well-known face detecting algorithm. In an example of the face detecting algorithm, the face detection module 131b may detect the faces from each of the first to fifth frames FR1 to FR5 by moving the plurality of rectangular regions within the frame. In this case, the facial region detection module 131b may prevent unnecessary facial region detection by setting the maximum size of the plurality of rectangular regions.

Since a plurality of persons may appear in the image (IMG), at least two or more persons' faces must be included within one representative frame. However, in a case where an entirety of face of a person is not exposed within one representative frame (for example, refer to second person P2 of the second frame FR2), it may be difficult to relatively compare with the face of another person within the same frame. Therefore, the face detection module 131b may reduce overhead regarding facial regional detection by setting a minimum size of the plurality of rectangular regions to a predetermined size so as to prevent detection of faces smaller than the predetermined size. In this case, the facial region of the second person P2 of the second frame FR2 will not be detected.

The facial region detection method of the facial region detection module 131b according to the technical idea of the present disclosure is not limited to the aforementioned face detecting algorithm. For example, the face detection module 131b may detect characteristics of a face within the representative frame such as eye, nose and mouse, etc., and detect the faces of the persons within the representative frame based on the detected characteristics.

Referring to FIGS. 6 and 7, the face detection module 131b may transmit the information on the faces extracted from each of the first to fifth frames FR1 to FR5 to the operator 132. The operator 132 may operate the number of the faces based on the received information on the faces and generate a face recognition result. For example, from the face detection module 131b, a plurality of operators 132 may receive information on faces A1 and A2 extracted from the first frame FR1, face A3 extracted from the second frame FR2, faces A4 and A5 extracted from the third frame FR3, faces A6 and A7 extracted from the fourth frame FR6 and faces A8 and A9 extracted from the fifth frame FR5.

In the face detection module 131b, a total of two faces were detected from the frames FR1, FR3 to FR5 excluding the second frame FR2. Therefore, the operator 132 may generate the face recognition result based on the frequency of the number of the faces detected from each of the first to fourth frames FR1 to FR5. For example, the operator 132 may compute '2' as the face recognition result. The computed face recognition result (for example, '2') may be transmitted to the server 500 through the communicator 150.

In another embodiment, the operator 132 may generate the face recognition result based on an average value of the number of the faces detected from each of the first to fifth frames FR1 to FR5. For example, the operator 132 may compute '1.8' as an operation result. In a case of generating the face recognition result using the average value, the operator 132 may generate '2' as the face recognition result by rounding off the numbers to the nearest whole number. The computed face recognition result (for example, '2') may be transmitted to the server 500 through the communicator 150.

As explained with reference to FIGS. 3 to 7, the terminal according to an embodiment of the present disclosure may detect faces from the image being received through the inputter during matching by the server. More specifically, the terminal may select at least one or more representative frame from among the plurality of frames of the image, and detect persons' faces included in the at least one or more representative frame selected. For example, the terminal may select a plurality of representative frames during one matching. In another example, the terminal may select at least one or more representative frame from each of the plurality of matching.

The terminal may detect faces included in at least one or more representative frame, and generate information on the number of the faces detected. Further, the terminal may transmit the face recognition result that includes the information on the number of the faces detected to the server.

Figure 8:
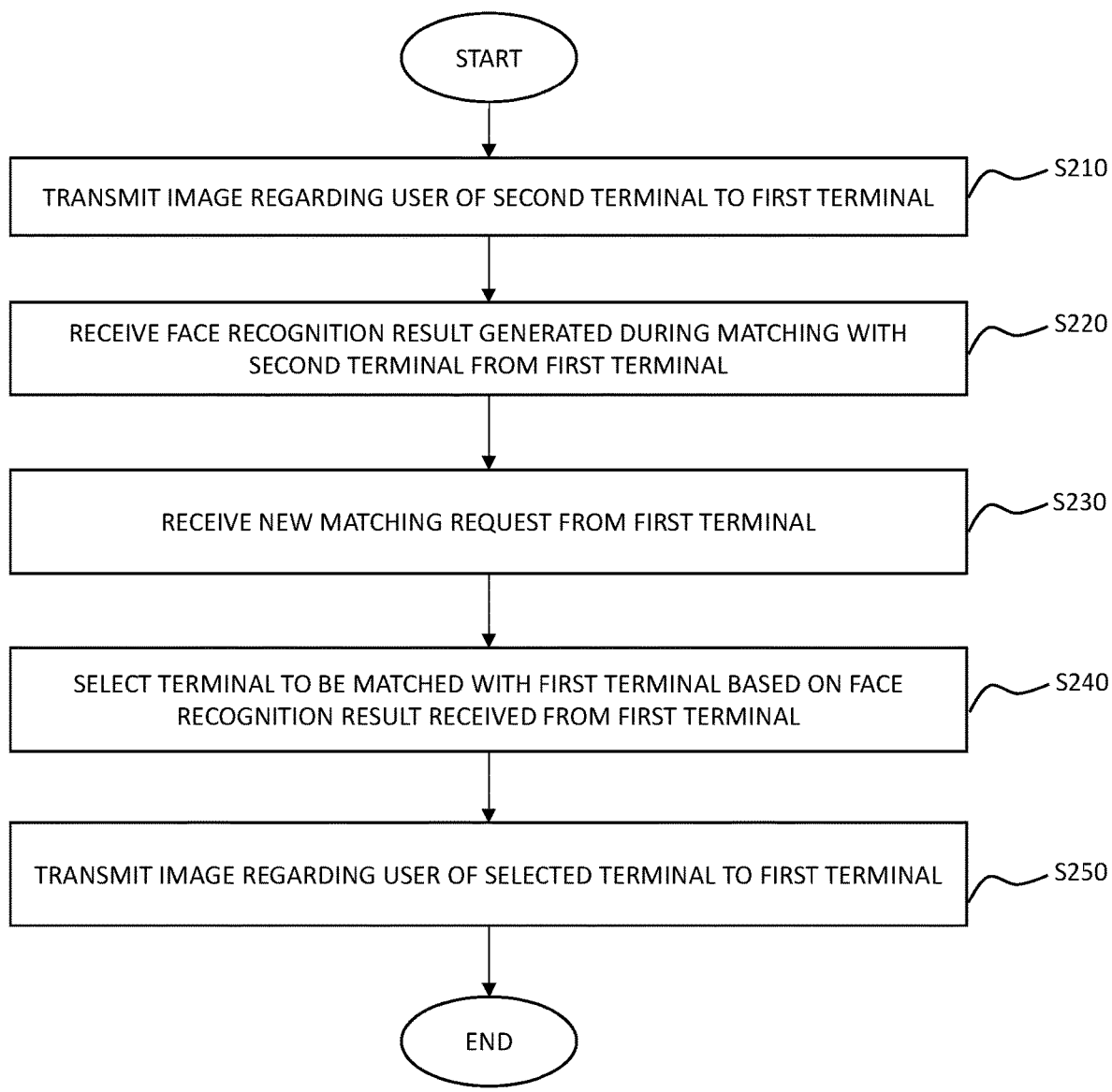
FIG. 8 is a flowchart illustrating an operation method of a server according to an embodiment of the present disclosure.

FIG. 8 is a flowchart illustrating an operation method of the server according to an embodiment of the present disclosure. Referring to FIGS. 1 and 8, at step S210, the server 500 may transmit an image regarding a user of the second terminal 200 to the first terminal 100. For example, in a case where the server 500 receives a matching request from the first terminal 100, the server 500 may match the first terminal 100 and the second terminal 200.

Further, for the video call to be performed between the first terminal 100 and the second terminal 200, the server 500 may transmit the image regarding the user of the second terminal 200 to the first terminal 100. Further, the server 500 may transmit an image regarding the user of the first terminal 100 to the second terminal 200. For example, the second terminal 200 may be selected randomly.

At step S220, the server 500 may receive from the first terminal the face recognition result being generated during the matching with the second terminal 200. The face recognition result may be information on the number of the faces included in the image being received through the inputter 110 of the first terminal. The face recognition result may be generated as explained with reference to FIGS. 2 to 7.

At step S230, the server 500 may receive a new matching request from the first terminal 100. For example, if the first terminal 100 wants to stop the video call with the second terminal 200 and wants video call with a new terminal, the first terminal 100 may transmit a new matching request to the server 100.

At step S240, the server 500 may select the terminal to be matched with the first terminal based on the face recognition result received from the first terminal 100. The face recognition result may be generated based on the method explained with reference to FIGS. 4 to 7. In an embodiment of the present disclosure, the server 500 may select the terminal that provided the same face recognition result as the first terminal 100 from among at least one or more terminal 200 to 400 giving that terminal the first priority to perform the video call with the first terminal 100.

The server 500 may store at least one or more list that includes at least one or more item. The list to be included in the server 500 may be explained with reference to FIG. 9.

Figure 9:
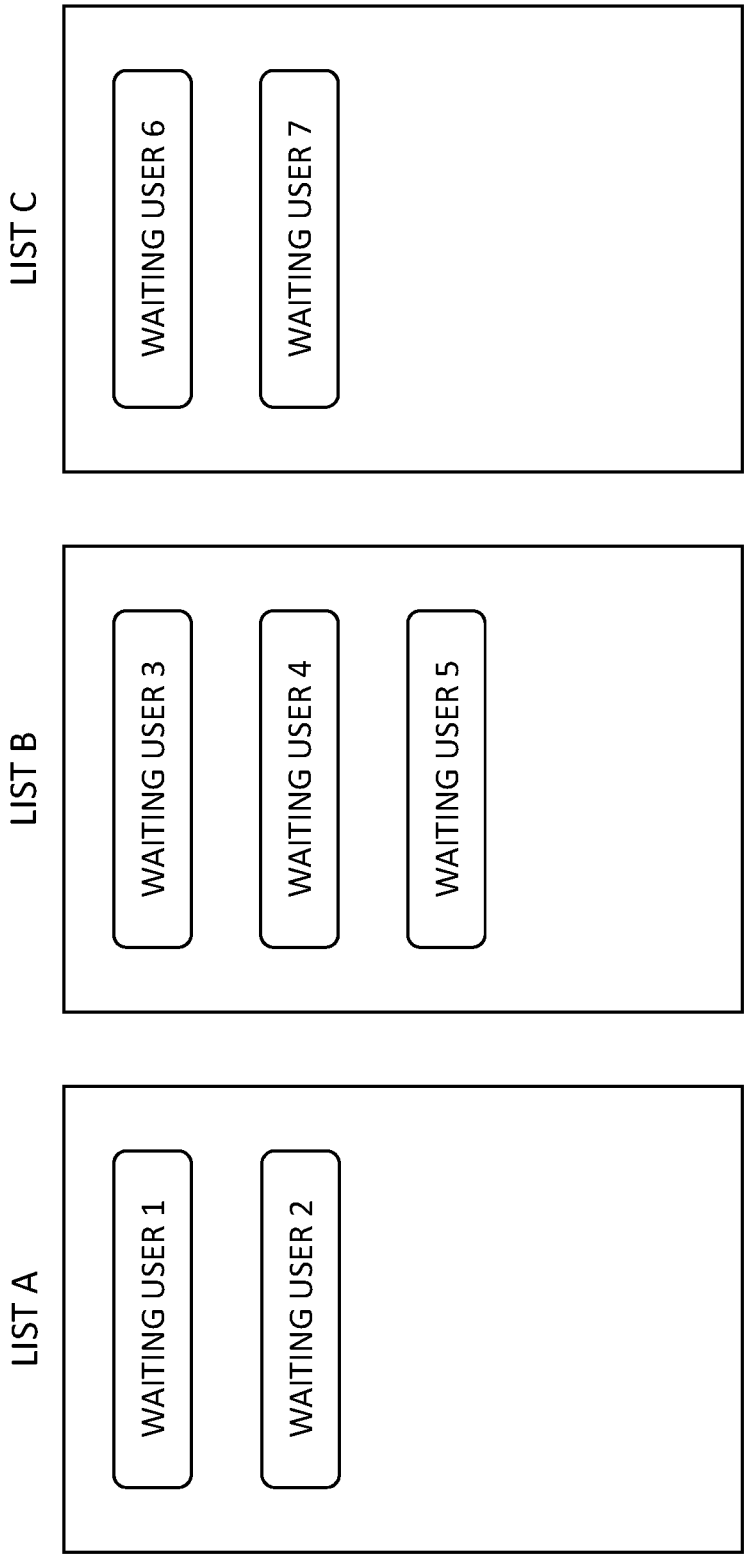
FIG. 9 is a diagram illustrating in detail a waiting users list to be stored in the server.

FIG. 9 illustrates in detail a waiting users list stored in the server. For example, the server 500 may include "list A", "list B" and "list C". The items included in each of the at least one or more list may correspond to each waiting user waiting to be mediated or to the terminals of the waiting users. Each item may correspond to a certain waiting user. The certain waiting user corresponding to each item may be different from one another. Each item may include information or identifier regarding the certain waiting user.

The information on the certain waiting user may include at least one or more of location information, gender information, age information, job information, interests information, ethnicity information, religion information, speaking language information and preferred counterpart conditions information of the certain waiting user, for example. The preferred counterpart conditions information of a certain waiting user may include at least one or more of location information, gender information, age information, job information, interests information, ethnicity information, religion information, speaking language information and preferred counterpart conditions information of the counterpart that the certain waiting user wants to be matched with.

Referring to FIG. 9, list A may include two items. The two items included in list A may each correspond to "waiting user 1" and "waiting user 2". List B may include three items. The three items included in list B may each correspond to "waiting user 3", "waiting user 4" and "waiting user 5". Further, list C may include two items. The two items included in list C may each correspond to "waiting user 6" and "waiting user 7".

At least two or more lists may each correspond to a certain value. For example, in a case where the certain value of each list is the 'face recognition result', list A may correspond to '1', list B may correspond to '2', and list C may correspond to '3'. More specifically, in a case where list A corresponds to '1', the face recognition result provided by "waiting user 1" and "waiting user 2" included in list A may be '1'. In a case where list B corresponds to '2', the face recognition result provided by "waiting user 3" "waiting user 4" and "waiting user 5" included in list B may be '2'. Further, in a case where list C corresponds to '3', the face recognition result provided by "waiting user 6" and "waiting user 7" included in list C may be '3'. In a case where the face recognition result provided by the first terminal 100 is '1', the server 500 may select one of the items included in list A as the terminal or user to be mediated with the first terminal 100. In a case where the face recognition result provided by the first terminal 100 is '2', the server 500 may select one of the items included in list B as the terminal or user to be mediated with the first terminal 100. Further, in a case where the face recognition result provided by the first terminal 100 is '3', the server 500 may select one of the items included in list C as the terminal or user to be mediated with the first terminal 100.

The number of lists to be included in the server 500 is not limited to three. According to the face recognition result being received from at least one or more terminal 200 to 400, the number of lists to be included in the server 500 may be changed.

In another embodiment, in a case where from among at least one or more terminal 200 to 400, there is no terminal that provided the same face recognition result as the face recognition result provided by the first terminal 100, the server 500 may select the terminal of second priority as the terminal to perform video call with the first terminal 100. For example, in a case where the face recognition result provided from the first terminal 100 is '2', the server 500 may select the terminal that provided the same face recognition result (for example, '2') from among at least one or more terminal 200 to 400 as the first priority.

In a case where from among at least one or more terminal 200 to 400 there is no terminal that provided the same face recognition result (for example, '2'), the server 500 may select the terminal of the second priority based on the face recognition result provided from the first terminal 100. For example, in a case where the face recognition result provided from the first terminal 100 is '2', the server 500 may select the terminal that provided the face recognition result of '2' or above from among at least one or more terminal 200 to 400 as the terminal to perform video call with the first terminal 100. Otherwise, in a case where the face recognition result provided from the first terminal 100 is '1', the server 500 may select the terminal that provided the face recognition result of '2' or below from among at least one or more terminal 200 to 400 as the terminal to perform video call with the first terminal 100.

At step S250, the server 500 may transmit an image regarding the user of the selected terminal to the first terminal 100. Therefore, the first terminal 100 may be matched with a new terminal and perform video call.

FIG. 10 is a flowchart illustrating a communication method of a terminal and server according to an embodiment of the present disclosure. Referring to FIGS. 1 and 10, at step S310, the first terminal 100 may transmit a first matching request to the server 500. At step S320, the server 500 may select the second terminal 200 in response to the first matching request, and transmit an image of the user of the second terminal 200 to the first terminal 100. For example, the server 500 may randomly select the second terminal 200 from among at least one or more terminal 200 to 400.

At step S330, the first terminal 100 may select at least one or more representative frame from among a plurality of frames of an image being received from the inputter 110, and recognize faces from the selected at least one or more representative frame. The first terminal 100 may recognize the faces and generate information on the number of the faces, and generate a face recognition result that includes the information on the number of the faces. The method for generating the face recognition result of the first terminal 100 may be similar or identical to what was explained with reference to FIGS. 3 to 7.

At step S340, the first terminal 100 may transmit a second matching request to the server 500. In a case where the matching between the first terminal 100 and the second terminal 200 is stopped, the first terminal 100 may transmit the second matching request to the server 500 for a new matching. At step S350, the server 500 may select the third terminal 300 in response to the second matching request. For example, the server 500 may randomly select the third terminal 300 from among the at least one or more terminal 200 to 400.

At step S360, the first terminal 100 may transmit the face recognition result to the server 500. For example, the first terminal 100 may transmit the face recognition result generated during the matching with the second terminal 200 to the server 500 during the matching with the third terminal 300. Further, at step S370, the first terminal 100 may transmit the third matching request to the server 500. In a case where the matching between the first terminal and the third terminal 300 is stopped, the first terminal 100 may transmit the third matching request to the server 500 for a new matching.

At step S380, the server 500 may select the terminal to perform video call with the first terminal 100 based on the face recognition result received from the first terminal 100. For example, the server 500 may select the terminal that provided the same face recognition result as the face recognition result received from the first terminal 100 as the terminal to perform the video call with the first terminal 100. Otherwise, the server 500 may select the terminal that provided the face recognition result that is similar to the face recognition result received from the first terminal 100 as the terminal to perform the video call with the first terminal 100. At step S390, the server 500 may transmit an image of the user of the selected terminal to the first terminal 100.

As explained with reference to FIGS. 1 to 10, the server 500 according to an embodiment of the present disclosure may mutually match a plurality of communication devices 100 to 400 more effectively. Further, the server 500 according to an embodiment of the present disclosure may mediate such that an appropriate user from among users of the plurality of communication devices 100 to 400 can be matched to a user of other communication devices. Further, by the communication method according to an embodiment, the user of each of the plurality of communication devices 100 to 400 may expand human relations through the mediation services.

The embodiments explained hereinabove may also be realized in forms of record media that include commands executable by computers such as program modules that are executed by computers. Computer readable media may be arbitrary fusible media that may be accessed by computers, and may include all volatile and nonvolatile media, and separable and non-separable media.

Further, computer readable media may include computer storage media and communication media. Computer storage media may include all volatile and nonvolatile, and separable and non-separable media realized by an arbitrary method or technology for storing information such as computer readable commands, data structures, program modules and other data. Communication media include traditional computer readable commands, data structures, program modules, other data of modulated data signals such as carrier waves and other transmission mechanisms, and may include arbitrary information transmission media.

At least one of the components, elements, modules or units (collectively "components" in this paragraph) represented by a block in the drawings such as FIGS. 2 and 3 may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Embodiments of the present disclosure were explained with reference to the drawings attached hereto, but a person skilled in the art will understand that the present disclosure may be implemented in other specific forms without changing its technical idea or essential characteristics. Therefore, the embodiments disclosed hereinabove must be understood as exemplary and not limiting the present disclosure in all aspects.

What is claimed is:

1. A communication, method comprising:
performing, by a first terminal, consecutive video calls with at least one second terminal;
selecting, by the first terminal, at least one representative frame from among a plurality of frames of a video image being photographed during each video call;
detecting, by the first terminal, a face from the at least one representative frame;
generating, by the first terminal, a face recognition result that includes infatuation on a number of faces detected from the at least one representative frame;
outputting, by the first terminal, the face recognition result to a server; and
upon termination of the video call with the at least one second terminal, performing, by the first terminal, a video call with a third terminal selected based on the face recognition result from the server,
wherein the third terminal is a terminal that outputs a face recognition result to the server which corresponds to the face recognition result output to the server by the first terminal.

2. The communication method according to claim 1,
wherein, the selecting, by the first terminal, the at least one representative frame from the plurality of frames of the video image being photographed during the video call, comprises selecting, by the first terminal, one representative frame from a certain section of the video image,
wherein, the detecting, by the first terminal, the face from the at least one representative frame, comprises detecting, by the first terminal, the face from the at least one representative frame, and
wherein the generating, by the first terminal, the face recognition result that includes the info, illation on the number of the faces included in the at least one representative frame comprises generating, by the first terminal, the face recognition result that includes the information on the number of the faces detected from the at least one representative frame.

3. The communication method according to claim 1,
wherein, the selecting, by the first terminal, the at least one representative frame from the plurality of frames of the video image being photographed during the video call comprises selecting, by the first terminal, a plurality of representative frames from a certain section of the video image,
wherein the detecting, by the first terminal, the face from the at least representative frame, comprises detecting, by the first terminal, the face from each of the plurality of representative frames, and
wherein the generating, by the first terminal, the face recognition result that includes the information on the number of the faces detected from the at least one representative frame based on the recognition result comprises generating, by the first terminal, the face recognition result based on the information on the number of the faces detected from each of the plurality of representative frames.

4. The communication method according to claim 3,
wherein the generating, by the first terminal, the face recognition result based on the information on the number of the faces detected from the each of the plurality of representative frames comprises generating, by the first terminal, the face recognition result based on an average value of the number of the faces detected from the each of the plurality of representative frames.

5. The communication method according to claim 3,
wherein the generating, by the first terminal, the face recognition result based on the information on the number of the faces detected from the each of the plurality of representative frames comprises generating, by the first terminal, the face recognition result from the number of the faces detected at a greatest frequency from among numbers of the faces detected from the each of the plurality of representative frames.

6. A non-transitory computer readable record medium where a program that is executed by the first terminal for executing the communicating method of claim 1 is recorded.

7. A communication method comprising:
receiving, by a server, a first video call request from a first terminal;
mediating, by the server, such that a video call can be performed between the first terminal and a second terminal selected from among at least terminal, in response to the first video call request;
receiving, by the server, a face recognition result being generated based on a video image being photographed during the video call with the second terminal, from the first terminal;
receiving, by the server, a second video call request from the first terminal;
selecting, by the server, a third terminal to be matched with the first terminal from among the at least one terminal based on the received face recognition result, in response to the second video call request; and
mediating, by the server, such that the video call can be performed between the first terminal and the third terminal,
wherein the third terminal is a terminal that outputs a face recognition result to the server which corresponds to the face recognition result received by the server from the first terminal.

8. The communication method according to claim 7,
wherein the selecting, by the server, the terminal to be matched with the first terminal from among the at least one terminal based on the received face recognition result, in response to the second video call request comprises selecting a terminal that provided the face recognition result that is identical to the face recognition result received from the first terminal from among the at least terminal.

9. The communication method according to claim 7,
wherein the face recognition result comprises information on the number of faces detected from the at least one representative frame selected from a plurality of frames of the video image.

10. The communication method according to claim 9,
wherein the selecting, by the server, the terminal to perform the video call with the first terminal based on the received face recognition result, in response to the second video call request comprises, in response to the number of the faces detected being plural, and in response to the face recognition result received from the first terminal from among the at least one terminal comprising information on the number of the faces that is two or more, selecting, by the server, a terminal that provided two or more face recognition results from among the at least one terminal as the terminal to be matched with the first terminal.

11. A communication method between a plurality of terminals and a server, the method comprising:

transmitting, by a first terminal from among the plurality of terminals, a first video call request, to the server;

mediating, by the server, such that a video call can be performed with a second terminal selected from among the plurality of terminals, in response to the first video call request;

generating, by the first terminal, a face recognition result after detecting the number of faces included in at least one representative frame from among a plurality of frames of a video image being photographed during the video call with the second terminal;

transmitting, by the first terminal, a second video call request to the server, in a case where the video call between the first tell urinal and the second terminal is terminated, mediating, by the server, such that a video call can be performed with a third terminal selected from among the plurality of terminals, in response to the second video call request;

transmitting, by the first terminal, the face recognition result to the server during the video call with the third terminal;

transmitting, by the first terminal, a third video call request to the server after the video call between the first terminal and the third terminal is terminated;

selecting, by the server, a terminal to perform a video call with the first terminal from among the plurality of terminals based on the face recognition result received from the first terminal, in response to the third video call request; and transmitting, by the server, an image of a user of the selected terminal to perform the video call, to the first terminal, wherein the third terminal is a terminal that outputs a face recognition result to the server which corresponds to the face recognition result received by the server form the first terminal.

12. The communication method according to claim 11, wherein the generating, by the first terminal, the face recognition result after detecting a face from the at least one representative frame from among the plurality of frames of the image being photographed during the video call with the second terminal comprises selecting, by the first terminal, the at least one representative frame from a certain section of the video image, and wherein detecting the face from the at least one representative frame, and generating the face recognition result that includes information on the number of the faces detected.

13. A communication device comprising:

an inputter configured to receive a photographed video image;

a controller configured to select at least one representative frame from among a plurality of frames of the video image, detect a face from the at least one representative frame, and generate a face recognition result that includes information on the number of faces detected; and a communicator configured to transmit the face recognition result to a server, and receive from the server an image regarding a user of a terminal selected based on the face recognition result.

14. The communication device according to claim 13, wherein the controller selects the at least representative frame per each certain section of the video image.

15. A communication method comprising:

performing, by a first terminal, at least one video call;

selecting, by the first terminal, at least one representative frame from among a plurality of frames of a video image being photographed while performing a first video call with a second terminal;

detecting, by the first terminal, a face from the at least one representative frame;

generating, by the first terminal, a face recognition result that includes information on the number of faces detected from the at least one representative frame;

outputting, by the first terminal, the face recognition result to a server in the middle of performing the first video call or in the middle of a second video call with a third terminal being performed after the first video call; and performing, by the first terminal, a third, video call with a fourth terminal selected based on the face recognition result from the server after the second video call, wherein the third terminal is a terminal that outputs a face recognition result to the server which corresponds to the face recognition result output to the server by the first terminal.

* * * * *